Figure 1:
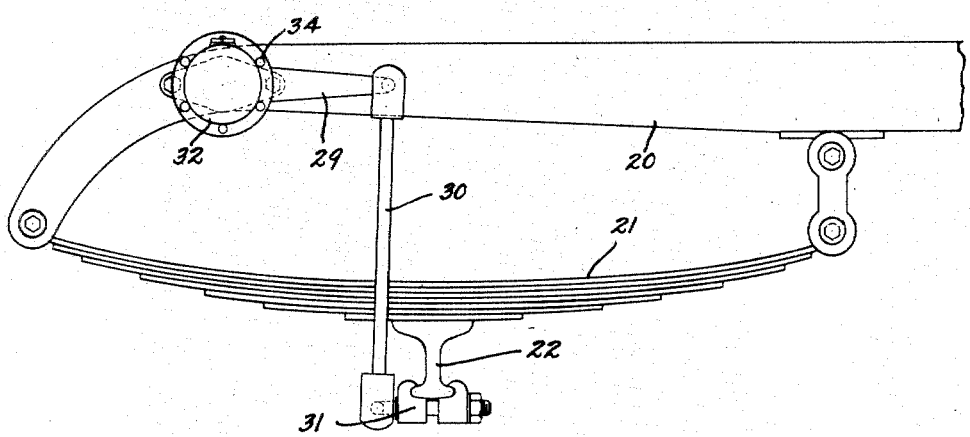

April 30, 1929.  W. A. CHRYST  1,710,861

SHOCK ABSORBER

Filed March 3, 1927

Inventor
William A. Chryst
By Spencer, Hardman & Fehr
his Attorneys

Patented Apr. 30, 1929.

1,710,861

UNITED STATES PATENT OFFICE.

WILLIAM A. CHRYST, OF DAYTON, OHIO, ASSIGNOR TO DELCO-REMY CORPORATION, OF DAYTON, OHIO, A CORPORATION OF DELAWARE.

SHOCK ABSORBER.

Application filed March 3, 1927. Serial No. 172,471.

This invention relates to a device for cushioning the movement of two relatively movable members, and is particularly adapted for use on motor vehicles, such as automobiles and the like.

It is among the objects of the present invention to provide a device of simplified structure and design which will cushion the movement of two relatively movable members in one direction to a substantially greater degree than in the other.

Further objects and advantages of the present invention will be apparent from the following description, reference being had to the accompanying drawings wherein a preferred embodiment of one form of the present invention is clearly shown.

Figure 2:
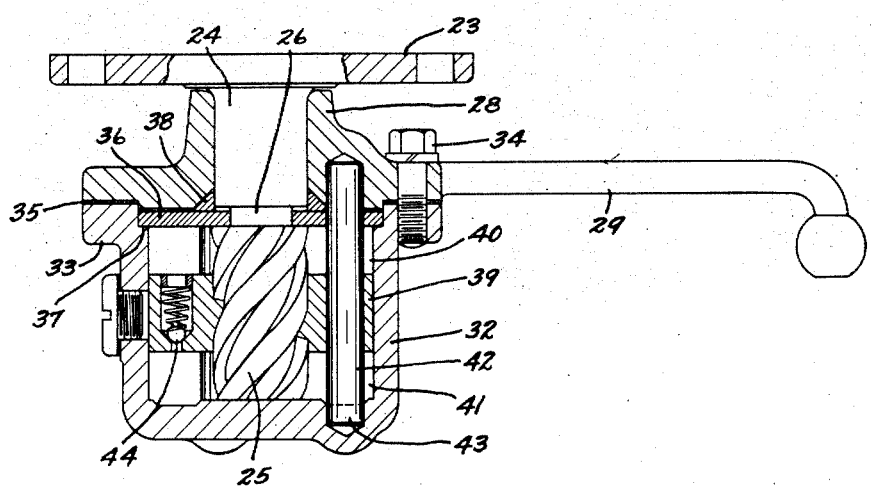

In the drawings:

Fig. 1 is a fragmentary view showing the cushioning device attached to an automobile frame and axle; and Fig. 2 is a cross sectional view of the device.

Referring to the drawings, the numeral 20 designates the frame of the automobile, to which is secured the spring 21. An axle 22, having the road wheels of the vehicle (not shown) mounted thereon, supports the spring 21.

The cushioning device comprises a supporting element having a mounting plate portion 23, adapted to be secured to the vehicle frame in any suitable manner. Attached to the mounting frame portion 23, or formed integral therewith, is a shank portion, one part of which, designated by the numeral 24, provides a bearing, the other part 25 has screw threads formed thereon. Intermediate the screw thread portion 25 and the bearing portion 24, the shank has a portion 26 of substantially lesser diameter than either the adjacent portions.

The closed cylinder, which provides a fluid reservoir rotatably supported on the bearing portion 24 of the shank, comprises two members, one of which is in the form of a disc 28 rotatably fitting on the bearing portion 24. An arm 29 extends from the disc 28, the free end of which is secured to the axle 22 by means of the rigid connection 30, attached to said axle by the clamp 31. The closed cylinder includes also the cup-shaped portion 32, the edge of which is provided with an outwardly extending, annular flange 33, provided with apertures, screw threaded, for receiving the clamping studs 34 which extend through corresponding apertures in the disc 28. A gasket 35 is placed between the disc and the flange 33 hermetically to seal this joint. A split plate 36 fits snugly about the reduced portion 26 of the shank, the outer edge of said split plate resting on a shoulder portion 37 provided in the cup. A packing member 38 is placed about the shank adjacent the bearing portion 24, said packing member being forced into sealing engagement with the disc and the bearing portion when the cylinder is drawn into closed engagement by the tightening of the studs 34, the plate 36 exerting the pressure upon the packing element 38 to hold it in this sealing engagement with the disc and stud.

A piston 39 is provided in the cylinder and divides said cylinder into two compartments 40 and 41 respectively. The piston is operatively connected with the screw threaded portion 25 of the shank. It is also connected with the cylinder so as to rotate therewith, said connection being made by the pin 42 which extends through a transverse passage in the piston, one end thereof being anchored in the end of the cylinder as at 43, the other end extending into a recess formed in the disc 28. From this it may be seen that the piston is rotatable with and longitudinally slidable relative to the cylinder 32. A check valve 44 is provided in the piston, said check valve establishing a flow of fluid from one side of the piston to the other at a substantially lesser rate, when the piston is sliding in one direction in the cylinder, than in the other. As shown, the valve 44 will permit the piston to move more freely toward the end of the cylinder than toward the disc 28. When said piston moves toward the end of the cylinder, the fluid, compressed in the chamber 41, will lift the valve against the effect of its associate spring, thereby permitting a substantially low restricted flow to the chamber 40. However, when the piston travels in the opposite direction or toward the disc 28, the fluid is trapped in the chamber 40, and being compressed therein, will close the check valve 44 tightly, the passage of the fluid from chamber 40 to 41 being past the pin 42, through the space between the piston and cylinder and through the space between the screw threads 25 and the piston, such passages offering comparatively greater resistance to the flow of fluid than the passage through the check valve 44.

When the vehicle wheels strike a substantial bump, the spring 21 will be moved toward the frame 20; thus the lever 29 will rotate the disc 28 in a counter-clockwise direction as regards Fig. 1. This will rotate the cylinder and the piston in a counter-clockwise direction about the screw threaded portion 25 of the shank, the threads 25 causing the piston to slide longitudinally in the cylinder toward the end thereof, and, as has been mentioned, compressing the fluid in the chamber 41, the check valve 44 offering a slight resistance to the flow of fluid into the chamber 40 and thus only slightly counteracting this movement of the spring. The spring will tend to return suddenly to its initial position, causing a reversal of movement, at which time the cylinder and the piston will be rotated in a clockwise direction about the shank, thus causing the piston to be moved toward the disc. The fluid being compressed in the chamber 40, due to this movement of the piston, cannot escape from said chamber into the chamber 41 as readily as the fluid will flow in the opposite direction, and thus the action of the device will tend to provide a drag on the movement of the spring toward its normal position, thereby cushioning said movement and substantially eliminating the ill effects experienced from road shocks due to bumps or uneven road bed.

Variations in the size of the check valve or in the working or running fit of the various moving elements of the device will vary the degree of cushioning effect. Loosely fitting moving parts will lessen the resistance to the flow of fluid from one side of the piston to the other, while tightly fitting parts will impede such flow to a greater degree and thus provide a cushioning device of greater movement resisting effort.

While the form of embodiment of the present invention as herein disclosed, constitutes a preferred form, it is to be understood that other forms might be adopted, all coming within the scope of the claims which follow.

What is claimed is as follows:

1. A device of the character described comprising a mounting bracket having a stud extending therefrom provided with an annular groove substantially midway between the end of the stud and the bracket, the portion of the stud adjacent the bracket presenting a bearing and the portion on the opposite side of the annular groove being screw threaded, a plate rotatably supported on the bearing portion of the stud, a housing secured to the plate and providing a chamber containing the screw-threaded portion of the stud, a split collar fitting about the annular grooved portion of the stud, said collar being clamped between the housing and the rotatable bracket, a packing gland between the rotatable plate and bearing portion of the stud, held therebetween by the split collar, a reciprocal member slidably fitting within the housing and operatively connected to the screw-threaded portion of the stud, means for preventing the said reciprocal member from rotating, but permitting it to slide within said housing, and a valve in said member for controlling the passage of fluid from one side thereof to the other when said member is reciprocated in the housing.

2. A device of the character described comprising, a mounting bracket having a stud extending therefrom, said stud presenting a bearing portion and a screw-threaded portion, both portions being separated by an annular groove in the stud, a plate rotatably supported on the bearing portion of the stud, a closed end housing supported on the plate, providing a chamber about the screw-threaded portion of the stud, the free end of which fits against the closed end of the housing, a packing between the bearing portion of the stud and rotatable plate, a split collar fitting in the annular groove in the stud and clamped between the plate and housing, said collar pressing the packing into sealing engagement with the stud and plate, a reciprocal member slidably fitting in the housing and operatively connected with the screw-threaded portion of the stud, and a valved passage in the reciprocal member, connecting the chamber portions on each side of said member and adapted to provide for a restricted flow of fluid from one side of the member to the other when said member moves toward the free end of the screw-threaded stud portion, said valve passage being closed tightly to prevent fluid passage therethrough when the said member is moved toward the seal provided by the packing and split collar on the stud.

In testimony whereof I hereto affix my signature.

WILLIAM A. CHRYST.